United States Patent
Eizmendi et al.

[11] Patent Number: 5,863,594
[45] Date of Patent: Jan. 26, 1999

[54] ELVER SUBSTITUTE MANUFACTURING PROCESS AND FACILITY

[75] Inventors: Juan Carlos Eizmendi; Santiago Otamendi, both of Aguinaga, Spain

[73] Assignees: Angulas Mayoz, S.L.; El Angulero de Aguinaga, S.L., both of Spain

[21] Appl. No.: 903,562

[22] Filed: Jul. 31, 1997

[51] Int. Cl.$^6$ .................................................. A23L 1/325
[52] U.S. Cl. ........................ 426/643; 426/646; 426/513; 426/516
[58] Field of Search ................... 426/643, 513, 426/516, 517, 646

[56] References Cited

U.S. PATENT DOCUMENTS

| | | | |
|---|---|---|---|
| 4,362,752 | 12/1982 | Sugino et al. | 426/104 |
| 4,579,741 | 4/1986 | Hanson et al. | 426/92 |
| 4,769,256 | 9/1988 | Matsumoto et al. | 426/643 |
| 4,816,278 | 3/1989 | Sasamoto et al. | 426/513 |
| 4,919,959 | 4/1990 | Hosaka et al. | 426/574 |
| 5,028,445 | 7/1991 | Wu et al. | 426/574 |
| 5,141,766 | 8/1992 | Miyakawa | 426/643 |
| 5,176,932 | 1/1993 | Sugino | 426/250 |
| 5,198,261 | 3/1993 | Sasaki et al. | 426/643 |

FOREIGN PATENT DOCUMENTS

| 396487 | 2/1994 | European Pat. Off. . |
|---|---|---|

*Primary Examiner*—Nina Bhat
*Attorney, Agent, or Firm*—Bierman, Muserlian and Lucas

[57] ABSTRACT

The process for making elver or eel substitute uses three separate paste mixtures which are prepared from surimi, salt and olive oil. Two of the paste mixtures have varying amounts of cuttlefish ink so that one of the pastes is gray in color while the other is dark in color. The paste mixture without any cuttlefish ink is light in color. These three separate paste mixtures are then separately transported and extruded through a nozzle head. The nozzle head has a cross-section similar to an elver and the three paste mixtures are joined at the nozzle head to form a layered roll where the light-colored paste is superimposed on the gray-colored paste and a thread of the dark-colored paste is positioned between the two pastes and at one end of the roll. The roll is then cut into pieces which take the appearance of an elver. The pieces are cooked in salt water at 75°–95° C. for 1–3 minutes and then cooled in a thermal shock vat with water at 4° C.

11 Claims, 2 Drawing Sheets

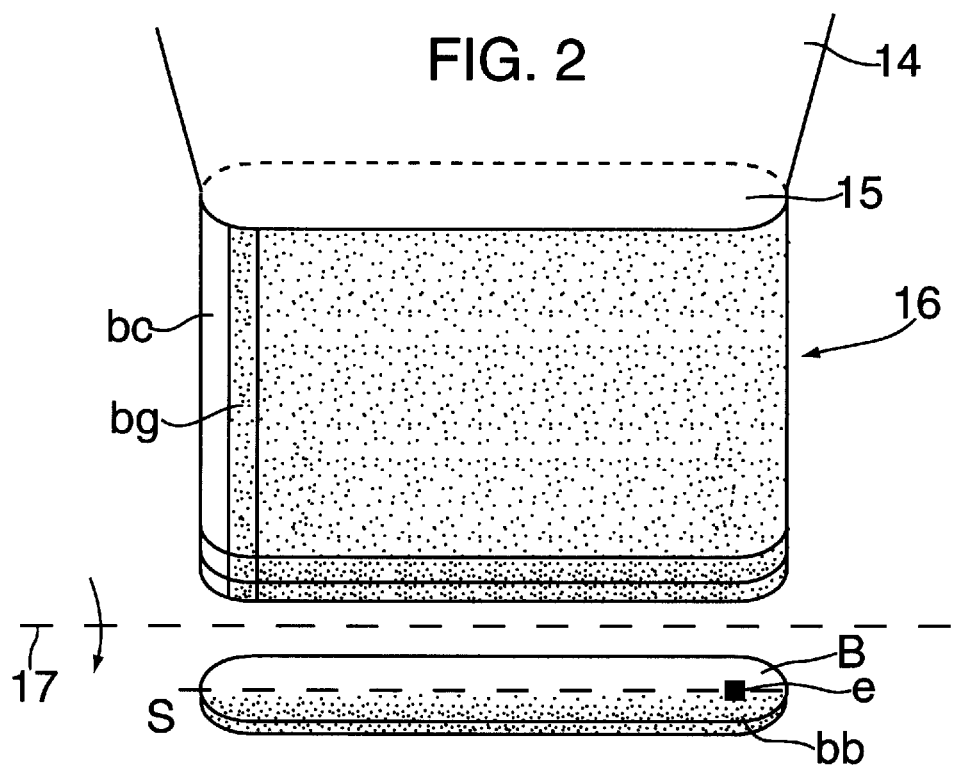
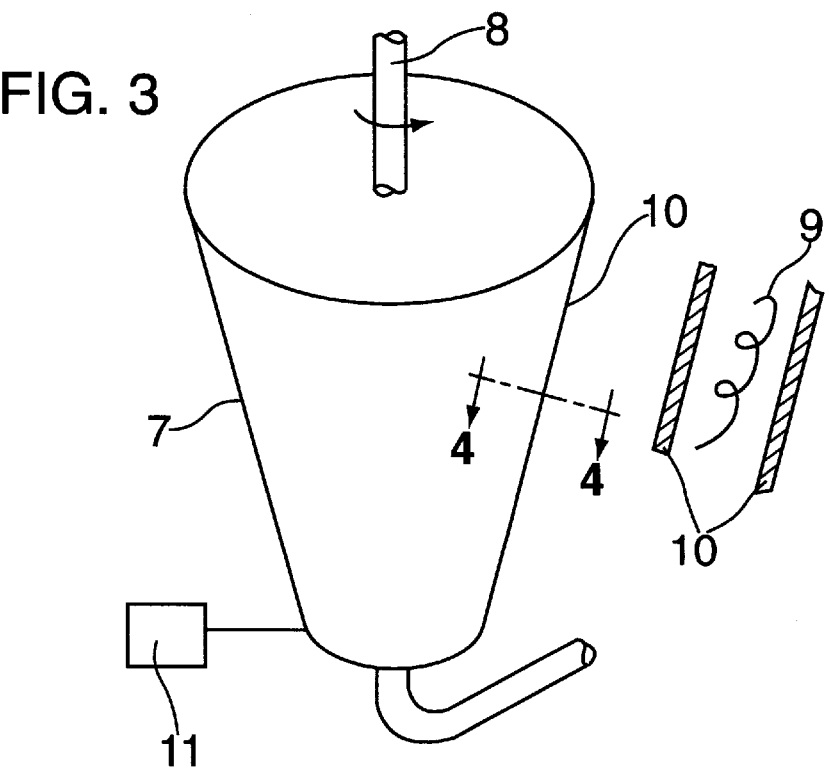

ELVER SUBSTITUTE MANUFACTURING PROCESS AND FACILITY

All types of fish and seafood substitute products have been being manufactured for a long time, mainly by the Japanese, based on a product known as surimi.

Quantities of starch and different types of albumen are added to the base product to attain a paste mixture used as the basis for many different substitutes which will then be differentiated from one another by means of the different treatments and the adding of small amounts of specific products such as aromatizers, extracts, flavorings, etc. for each type of substitute.

In the specific case of elvers, that is to say, of the elver substitute, the appearance of shape, texture, contrast of coloring among the body, backbone and eyes are fundamental so that consumers will find the product to be visually appealing and for the substitute to actually look like a true elver.

The appearance, consistency and texture objectives have not been achieved to date, comprising the goal which have been accomplished by means of the process and facility comprising the object of this invention, based upon the processing of three different pastes instead of one sole paste, that is to say, one light-colored paste mixture, one gray-colored paste mixture and a dark-colored paste mixture, which are transported separately from one another to extruder heads, being extruded separately toward a nozzle fitted with an elver-shaped opening and obtaining an extruded, layered roll in which the white paste surrounds the outside of the gray paste, a thread of dark-colored paste being located in between and at the end of these two layers, the entire combined paste thus comprised being cooked inside a cooking tube in water of a salinity similar to seawater at a temperature of approximately 75° C.–95° C. for 1 to 3 minutes, after which the product is then transported to a thermal shock vat containing water at approximately 4° C.

Other features will be explained at a further point herein.

For a further comprehension of the object of the present invention, a preferential practical embodiment, which is subject to addition changes which do not detract from the fundamentals thereof, are provided on the drawings.

FIG. 1 provides a diagram of the stages of the process and of the facility comprising the object of the invention.

FIG. 2 shows the layered roll (16) which comes out of the extruder heads, which, on being cut, gives rise to the substitute elver shapes and colors.

FIG. 3 is a diagram of an extrusion batcher.

FIG. 4 is a detail of cross-section A:A of FIG. 3 as regards the batcher walls.

Figure 1:
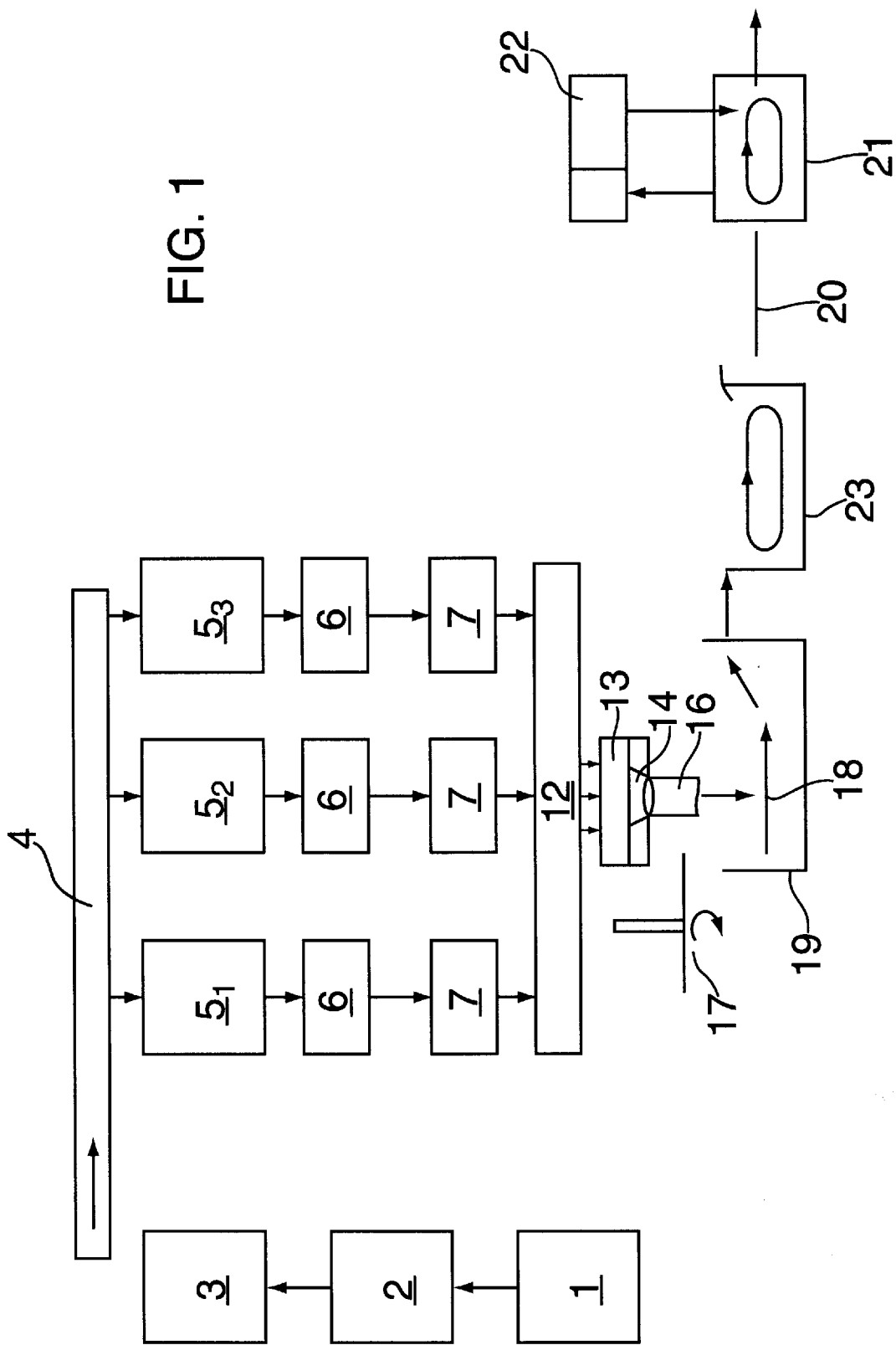

A description is provided in following of a nonrestrictive practical embodiment of the present invention.

The staring base product is surimi.

Blocks of surimi are stored at −25° C. in a chamber (1) from which they are removed for use and are placed inside an antichamber (2) at an approximate temperature of 0° C.–30° C. for approximately 13 hours for the decrystallization thereof.

In following, the blocks of surimi are cut up in a block breaker (3), out of which a conveyor belt (4) runs for feeding the heat-insulated, vacuum batchers $(5_1)$, (52), $(5_3)$, the bottom section of which are comprised of mixing rollers.

The conveyor belt (4) can be an assembly of belts, one of the sections of which is moveable for the purpose of facilitating said feeding, which can be done continuously/ intermittently and simultaneously to all of the batchers or to one batcher after the other.

The paste mixture in the first mixer batcher $(5_1)$ will be used to make the light-colored body (B) of the substitute (S); the paste in the second batcher $(5_2)$ being used to make the dark-colored backbone (bb), and that of the third batcher $(5_3)$ for the eyes (e) almost black in color (FIG. 2) as will be explained at a further point herein.

In the paste-mixing batchers (5), the process of turning the chopped surimi into paste is begun for 7 to 8 minutes at an approximate temperature of −2° C. The quantity of surimi to be mixed will be in an approximate weight-related proportion of 60% as regards the final product. In following, salt is added and mixing is continued for approximately 7 minutes to achieve a viscous paste.

The following step is to add the conventional ingredients for fish and seafood substitutes to the first and second $(5_1)$ $(5_2)$ batchers, such as gelificating rice starch, milk or egg albumen and small quantities of special products for this process which are added in the following approximate quantities:

| | |
|---|---|
| Seaweed extract | 0.5% |
| Glucoloid | 0.4% |
| Sugars | 0.2% |
| Chopped tuna bone | 0.2% |
| Glycine | 0.2% |
| Delayed-action gelling ingredient | 0.1% |
| Proteins | 4% |
| White wine | 2% |
| Natural elver/eel aroma | 0.4% |
| Natural elver/eel extract | 0.4% | and in the third batcher $(5_3)$ solely the starch and albumen.

Mixing is continued for approximately 5 minutes, allowing the temperature to rise to approximately 2° C.

The water is progressively added during the mixing process.

The batchers are fitted with the pertinent heat-control devices for maintaining the desired temperatures.

In following 4% olive oil is added and mixing is continued for 2 minutes, allowing the temperature to rise to 5° C.

At this stage, 1% cuttlefish ink is added to the second batcher $(5_2)$ to give the paste its gray color; a higher proportion of cuttlefish ink (i.e. 3%) being added to the third batcher $(5_3)$, giving the paste mixture a black color.

One sole paste mixture can also be prepared and then add the cuttlefish ink thereto in varying proportions.

Upon completion of the mixing process, the paste is unloaded from the mixer rollers through a lower trap door with which the same are fitted into moveable pump transfer hoppers (6) equipped with a homogenization device and cone-shaped, from which the paste mixture is pumped to cone-shaped extrusion bins (7) (FIGS. 3, 4) in which the paste mixture is homogenized by means of a revolving arm (8) and is maintained at a temperature of 5° C. by means of a refrigerating coil (9) between the double wall (10) of the bin (7) or by an equivalent means.

The extruding means (11) installed inside the bin (7) cone outlet and by means of a valvular device (12), in order to provide for the desired interconnections, send the paste mixtures to the extruder heads (13), keeping the three paste mixtures (light-colored, gray, dark-colored) separate from one another and which are pushed out through a nozzle (14) in which a layer of light-colored paste mixture (bc) is superimposed over a layer of gray-colored paste mixture (bg), with a thread of dark-colored paste mixture being kept between these two layers and at one end thereof. The opening (15) of the nozzle (14) is elver-shaped, a layered roll (16) thus flowing out of the same, which, on being cut by the cutting mechanisms (17) each section (S) (substitute) has the shape of an elver with a dark-colored backbone (bb), a light-colored body (B) and black eyes (e).

The paste mixture sections (s) drop onto a conveyor belt (18) in a cooking tube (19) containing water of a salinity similar to seawater at a temperature of 75° C.–95° C. for 1 to 3 minutes.

In following, the product is transferred to a thermal shock vat (23) which contains water at approximately 4° C., where it remains for 20–60 seconds. Aromas can be added to this vat.

The product is then preferably run through a vibrator (20), where the water adhered to it is drained off prior to the product being inserted into a drying-sterilization tube (21).

The drying is process is by closed-circuit forced air, for which purpose the pertinent filter, compressor, drains (22), etc., and, if desired, cooled air, are provided. Depending upon the means employed, the drying times will vary, ranging from 4 to 5 minutes.

The product thus processed will be ready to package, freeze, pasteurize, etc. The elver substitute manufacturing process and facility of the present invention can be described by the following procedures:

a) blocks of surimi are placed in an antichamber (1) at a temperature of approximately 0° C. for around 13 hours, where they are transferred to b) a surimi block breaker (2), the pieces being transported to c) heat-insulated, vacuum batchers ($5_1$), ($5_2$), ($5_3$) in at least one of which ($c_1$) an initial light-colored paste mixture is prepared according to the following steps ($c_{11}$) the paste-mixing process is started at a temperature of approximately 2° C. and is run for around 8 minutes ($c_{12}$) salt is added and the mixing continued for approximately another 7 minutes ($c_{13}$) the substitute ingredients are added and the mixing continued for approximately another 5 minutes, allowing the temperature to rise to approximately 2° C.

($c_{14}$) olive oil is added, the paste mixture is mixed for approximately 2 minutes, and the temperature is allowed to rise to approximately 5° C.;

($c_2$) a second paste mixture, gray in color, by adding cuttlefish ink to the initial paste mixture, and ($c_3$) a third, dark-colored paste mixture, by adding cuttlefish ink to the basic ingredients of the initial or second paste mixture;

d) the light-colored paste mixture, the gray-colored paste mixture and the dark-colored paste mixture are transported separately to extruder heads (13), being extruded separately toward a nozzle fitted with an elver-shaped outlet opening, and an extruded layered roll (16) being obtained in which the white paste mixture is superimposed on the gray-colored paste mixture, a thread of dark-colored paste mixture being located between the two and at one end thereof, and comprised of e) cutting mechanisms which cut the layered roll in the thickness of an elver and dropping in pieces (s) into f) a cooking tube (19) containing water with a salinity similar to seawater, at a temperature of approximately 75° C. to 95° C. for 1 to 3 minutes, after which the product is transferred g) to a thermal shock vat (23) containing water at approximately 4° C.

In the process for making the elver substitute, it is preferred that:

a) the product remains in the thermal shock vat (23) for 20–60 seconds, after which it is then transferred to b) a vibrator (20) to drain off the water, after which it is transferred to c) a forced-air convection drying tube.

More preferably, the thermal shock vat contains aromatizing products. The forced convection is preferably by means of cooled air. Even more preferably, the product is transported from the batchers ($5_1$), ($5_2$), ($5_3$) by means of transfer pump hoppers (6) equipped with a homogenization device to refrigerated, cone-shaped extruder bins (7) equipped with a homogenization device, at the opening of which the extrusion mechanisms (11) are installed to push the paste mixtures toward the extruder head (13).

The preferred ingredients of the elver substitute are starch, albumen, proteins and

| | |
|---|---|
| Seaweed extract | 0.5% |
| Glucoloid | 0.4% |
| Sugars | 0.2% |
| Chopped tuna bone | 0.2% |
| Glycine | 0.2% |
| Delayed-action gelling ingredient | 0.1% |
| Proteins | 4% |
| White wine | 2% |
| Natural elver/eel aroma | 0.4% |
| Natural elver/eel extract | 0.4% |

We claim:

1. A process for making an elver substitute comprising:

(a) decrystallizing frozen blocks of surimi by placing said blocks in a chamber at about 0° C. to about 30° C. for about 13 hours;

(b) cutting the decrystallized blocks of surimi into pieces of surimi;

(c) depositing the pieces of surimi into three separate vacuum batchers;

(d) forming a first paste which is light in color by mixing pieces of surimi with salt and olive oil in a first vacuum batcher;

(e) forming a second paste which is gray in color by mixing pieces of surimi with salt, olive oil, and cuttlefish ink in a second vacuum batcher;

(f) forming a third paste which is dark in color by mixing pieces of surimi with salt, olive oil, and cuttlefish ink in a third vacuum batcher;

(g) transporting separately said first, second and third pastes from said first, second and third vacuum batchers to an extruded head;

(h) extruding separately said first, second and third pastes through an extruded head to a nozzle, said nozzle having a cross-sectional shape similar to an elver;

(i) combining said first, second and third pastes at said nozzle to form a layered roll having a cross-sectional shape similar to an elver, wherein said first paste is superimposed on said second paste and a thread of said third paste is located between said first and second paste at one end of said roll;

(j) cutting pieces having a thickness similar to the thickness of an elver from said roll;

(k) cooking the pieces of said roll in a cooking tube in water having a salinity similar to seawater at about 75° C. to about 95° C. for about 1 to about 3 minutes; and (l) cooling quickly the cooked pieces of said roll in a thermal shock vat in water at about 4° C. to obtain an elver substitute.

2. The process of claim 1 wherein the step of forming a first paste comprises the steps of:
(i) chopping said pieces of surimi at a temperature of about 2° C. for about 8 minutes;
(ii) adding salt to the chopped surimi and mixing for about 7 minutes;
(iii) adding substitute ingredients and continuing to mix for about 5 minutes while allowing the temperature to rise to about 2° C; and
(iv) adding olive oil and continuing to mix for about 2 minutes while allowing the temperature to rise to about 5° C. to form said first paste.

3. The process of claim 1 wherein the step of forming a second paste comprises the steps of:
(i) chopping said pieces of surimi at a temperature of about 2° C. for about 8 minutes;
(ii) adding salt to the chopped surimi and mixing for about 7 minutes;
(iii) adding substitute ingredients and continuing to mix for about 5 minutes while allowing the temperature to rise to about 2° C.;
(iv) adding olive oil and continuing to mix for about 2 minutes while allowing the temperature to rise to about 5° C.; and
(v) adding cuttlefish ink and continuing to mix to form said second paste.

4. The process of claim 3 wherein the water in said thermal shock vat contains aromatizing products.

5. The process of claim 3 wherein said forced-air convection drying tube uses cooled air.

6. The process of claim 1 wherein the step of forming a third paste comprises the steps of:
(i) chopping said pieces of surimi at a temperature of about 2° C. for about 8 minutes;
(ii) adding salt to the chopped surimi and mixing for about 7 minutes;
(iii) adding substitute ingredients and continuing to mix for about 5 minutes while allowing the temperature to rise to about 2° C.;
(iv) adding olive oil and continuing to mix for about 2 minutes while allowing the temperature to rise to about 5° C.; and
(v) adding cuttlefish ink and continuing to mix to form said third paste.

7. The process of claim 1 wherein
the cooked pieces of said roll are cooled in said thermal shock vat for about 20 to about 60 seconds; and said process further comprises the steps of:
draining the water off the cooled, cooked pieces of said roll in a vibrator, and subsequently
drying the cooled, cooked pieces of said roll in a forced-air convection drying tube.

8. The process of claim 1 wherein said transporting step comprises:
unloading said first, second and third pastes into respective first, second and third transfer pump hoppers equipped with a homogenization device so as to maintain said first, second and third paste separate from each other; and subsequently pumping said first, second and third pastes from the respective transfer pump hoppers to respective first, second and third refrigerated, cone-shaped extruder bins equipped with a homogenization device, so as to continue to maintain said first, second and third pastes separate from each other.

9. The process of claim 1 wherein the step of forming a first paste, and forming a second paste, each further comprises the step of adding and mixing with said pieces surimi, starch, albumen, protein and seaweed extract 0.5%; glucoloid 0.4%; sugars 0.2%; chopped tuna bone 0.2%; glycine 0.2%; delayed-action gelling ingredient 0.1%; proteins 4%; white wine 2%; natural elver/eel aroma 0.4%; natural elver/eel extract 0.4%.

10. An elver substitute made by the process of claim 9.

11. An elver substitute made by the process of claim 1.

* * * * *

UNITED STATES PATENT AND TRADEMARK OFFICE
CERTIFICATE OF CORRECTION

PATENT NO. : 5,863,594
DATED : July 31, 1997
INVENTOR(S) : Juan Carlos Eizmendi

It is certified that error appears in the above-indentified patent and that said Letters Patent is hereby corrected as shown below:

Column 1, line 5, delete "being"; line 20, change "have" to --has--; line 41, change "addition" to --additional--; line 42, change "are" to --is--; and change "on" to --in--; line 49, change "A:A" to --4-4--; line 56, change "antichamber" to --antechamber--; line 61, change "(52)" to --($5_2$)--; line 62, change "section" to --sections--.

Column 3, line 23, change "antichamber" to --antechamber--; line 34, change "2°C" to -- -2°C--.

Column 5, line 7 (claim 2), change "2°C" to -- -2°C--; line 20 (claim 3), change "2°C" to -- -2°C--; line 39 (claim 6), change "2°C" to -- -2°C--.

Column 6, line 23 (claim 8), change "paste" to --pastes--.

Signed and Sealed this

Twenty-ninth Day of June, 1999

Attest:

Q. TODD DICKINSON

*Attesting Officer*   Acting Commissioner of Patents and Trademarks